UNITED STATES PATENT OFFICE.

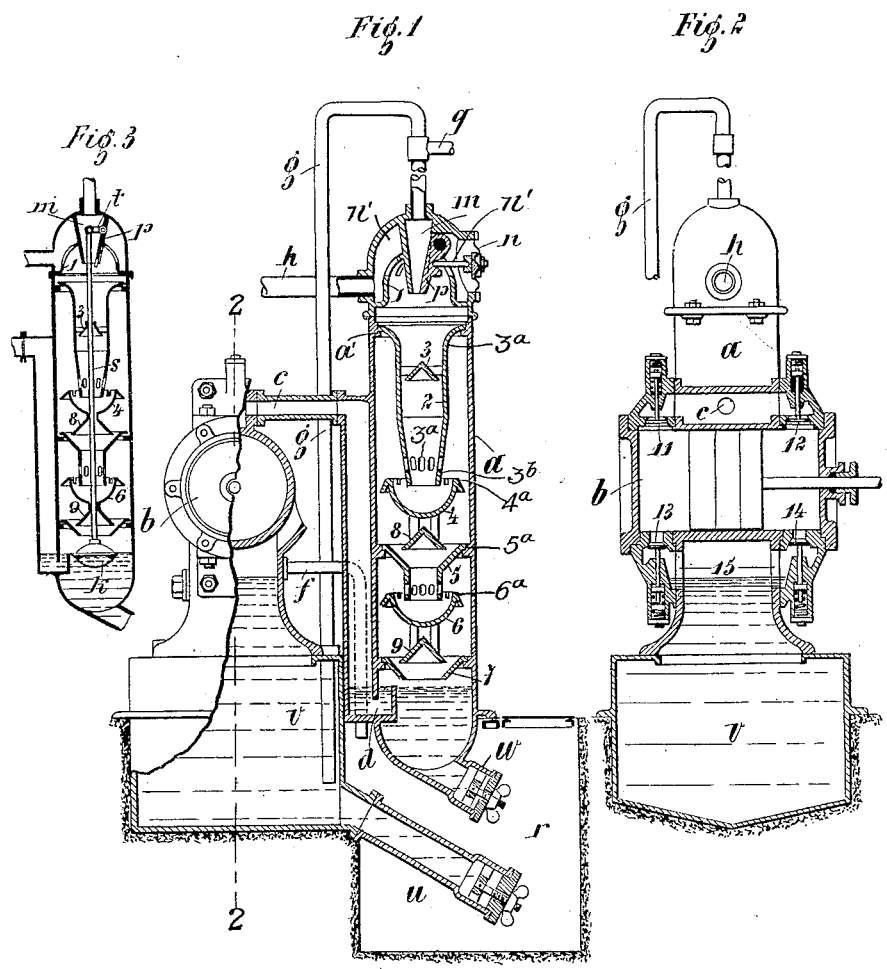

KARL KOSAK AND RICHARD HERZ, OF VIENNA, AUSTRIA-HUNGARY.

APPARATUS FOR PURIFYING AIR.

No. 920,584.      Specification of Letters Patent.      Patented May 4, 1909.

Application filed June 7, 1907. Serial No. 377,783.

*To all whom it may concern:*

Be it known that we, KARL KOSAK and RICHARD HERZ, both citizens of the Empire of Austria-Hungary, residing at Vienna, in the Empire of Austria-Hungary, have invented certain new and useful Improvements in Apparatus for Purifying Air, of which the following is a specification, reference being had therein to the accompanying drawing.

This invention relates to improvements in apparatus for purifying air and is especially adapted for purifying dust ladened air.

One of the objects of this invention is to avoid the use of cloth and other forms of filters heretofore used in connection with apparatus of this nature wherein a vacuum is created in carrying out the purifying process.

One of the advantages of avoiding the use of a cloth or like filter consists in avoiding the resistance or tendency to destroy the vacuum encountered in devices heretofore used.

The nature and objects of this invention will be more fully set forth in connection with the accompanying drawing and will be more particularly pointed out and ascertained in and by the appended claims.

In the drawing, Figure 1 is a sectional view partly in elevation of a device embodying the main features of the invention. Fig. 2, is a sectional view on line 2—2 of Fig. 1. Fig. 3, is a sectional view of a modified form of the invention.

Like characters of reference designate similar parts throughout the different figures of the drawing.

Considered generally the device of my invention comprises a vacuum purifying chamber to which the impure air is delivered and in which the air is commingled with water delivered to said chamber, the latter being provided with elements serving to spray the water during its passage through said chamber to more effectively mix and blend the air therewith and effect purification. In order to render the apparatus economical in the use of water a continuous circuit is provided for the same and the water is continuously used until its cleansing or purifying capacity is exhausted or in other words until by continued use the water itself has become impure. Desirable means are provided for creating a vacuum which means is also used for effecting a positive circulation of the water or other purifying agent.

Considered with respect to the specific forms illustrated the invention comprises a vacuum chamber $a$ which as shown is vertically disposed and is provided with means for spraying the water or liquid in its passage through said chamber. As shown said means comprises a nozzle 2, disposed adjacent the upper end of said chamber, and provided with a deflector 3. Said nozzle 2 is flared at its intake or base end as indicated at $3^a$ and is removably seated on an annular shoulder $a'$. At its discharge end said nozzle is slightly restricted as is indicated at $3^b$ and is provided with a plurality of apertures $3^c$ as shown. Said nozzle 2 delivers to a receiver 4 whose upper flange or margin at $4^a$ is so formed that the overflowing water will be discharged in the form of an annular spray. Beneath the receiver 4 is provided a deflector 8 located in a manner to deliver the water discharged thereon in the form of a spray into a nozzle 5 located immediately below the deflector 8. Said nozzle 5 is loosely mounted at its upper enlarged end at $5^a$ and discharges at its lower contracted end into a receiver 6 which is provided on its upper margin $6^a$ with a flange similar to the flange $4^a$ of the receiver 4. A deflector 9 located below the receiver 6 delivers to a nozzle 7 in a manner similar to the deflectors hereinbefore described. At its lower end said chamber $a$ is provided with a closable cleaning outlet $w$. Above its lower end and preferably immediately below the nozzle 7 the chamber $a$ is provided with a trap $d$ the purpose of which will hereinafter more fully appear. Water is delivered to the chamber $a$ at $m$ which point of delivery is provided with a nozzle. Conveniently means are provided for varying and controlling the discharge from said nozzle and in one embodiment of the invention the said means is operated by the vacuum within the chamber $a$. As shown said nozzle is provided with a pivoted side wall $p$ the lower end of which is adapted to be moved to contract or enlarge the discharge end of said nozzle. A diaphragm $n$ is provided as shown and is connected with said wall $p$ by a rod $n$. A greater or less degree of vacuum in the chamber $a$ will serve, in connection with the outer air, to operate said side wall $p$ in a manner to control the admission of water to the chamber $a$. A hood $l$ forms in connection with said nozzle an air receiving chamber $h'$ into which air is received from a pipe $h$ and said chamber communicates through suitable openings shown with the vacuum chamber 3.

The means for creating a vacuum and effecting the circulating of the water or other cleaning agent shown consists of a pump $b$ provided with the usual piston and intake valves 11 and 12 and outlet valves 13 and 14. Said intake valves communicate with a vacuum chamber $a$ through a passage $c$ and the trap $d$. The outlet valves are connected by a passage 15 with a reservoir $v$ and with an outlet $f$ through which latter the purified air is discharged. The reservoir $v$ is provided with a closable cleaning outlet $u$ which together with the outlet $w$ conveniently discharges into a suitable receiver $r$ when opened for cleaning purposes, it being understood that said outlets $u$ and $w$ are closed during the operation of the apparatus. The water is conveniently delivered to the vacuum chamber by a pipe $g$ which communicates with the reservoir $v$ and with the nozzle $m$.

The operation is as follows: In starting the apparatus the reservoir $v$ is filled with water or other suitable cleaning agent to the level of pipe $f$, which may serve as an overflow pipe, and a chamber $a$ is filled with water as indicated in Fig. 1 to such a level to make the trap $d$ effective. When the pump is started a vacuum will be created in the chamber $a$ after the air therein has been drawn through passage $c$ and the dust laden or impure air will be drawn into the chamber $a$ through pipe $h$. Simultaneously with the admission of air, water will be drawn into the chamber $a$ through pipe $g$ as the air and water pass downwardly through the chamber the superposed deflecting and spraying means will thoroughly commingle the air and water and the same will be received in the bottom of the chamber $a$. The circuit will be completed by passage through $c$ to the pump $b$ and from thence to the reservoir $v$ and thereupon the impurities will sink to the bottom of the reservoir $v$ and the pure air will be discharged through pipe $f$.

In the modified form shown in Fig. 3, the discharge of the nozzle $m$ is controlled by a float K located in the lower end of the chamber $a$. Said float is connected by a stem $s$ with a lever $t$ secured on the pivotal mounting of the side wall $p$. Said stem $s$ is guided by passing through suitable openings in deflector 3 and receivers 4 and 5. As the water in the vessel $a$ rises above a pre-determined point the float K will act to close the nozzle $m$ and when the level of the water descends the float K will act to open the nozzle $m$.

Having now particularly described and ascertained the nature of our said invention and in what manner the same is to be performed, we declare that what we claim is:

1. An apparatus for purifying dust laden air comprising in combination, a vacuum chamber provided with a plurality of superposed spraying elements, an inlet for dust laden air delivering to said chamber, a source of supply of water delivering to said chamber, means creating a vacuum in said chamber for inducing a flow of dust laden air and water upon said elements and through said chamber, and automatic means for controlling the delivery of water to said chamber.

2. An apparatus for purifying dust laden air comprising in combination, a vacuum chamber provided with a plurality of superposed spraying elements, an inlet for dust laden air communicating with said chamber, a source of supply of water communicating with said chamber, means for creating a vacuum in said chamber to induce a flow of dust laden air and water through said chamber and upon said elements, and means controlled by the internal pressure in said chamber for governing the supply of water thereto.

3. An apparatus for purifying dust laden air comprising in combination, a vacuum chamber provided with a plurality of spraying elements, a reservoir communicating with said chamber and with the atmosphere, and a vacuum pump having outlet and inlet portions, said inlet portion communicating with said vacuum chamber to produce a vacuum therein and induce a flow of water therethrough, the outlet portion of said pump communicating with said reservoir, and an inlet communicating with said chamber for conveying dust laden air thereto.

4. An apparatus for purifying dust laden air comprising in combination, a vacuum chamber provided with a plurality of spraying elements, a reservoir communicating with the atmosphere and connected with the top of said chamber, a pump having outlet and inlet portions, the inlet portion connected with the bottom of said chamber and the outlet portion being connected with said reservoir, a hydraulic seal interposed between said pump inlet and said chamber, and a pipe discharging to said chamber for conveying dust laden air thereto.

5. An apparatus for purifying dust laden air comprising in combination, a vacuum chamber provided with a plurality of superposed spraying nozzles, receivers and deflectors, a reservoir communicating with the atmosphere, a pipe leading from said reservoir to the top of said chamber, a pump